Sept. 9, 1941.  C. T. McGILL  2,255,324
FLOW REGULATING VALVE
Filed Feb. 15, 1938
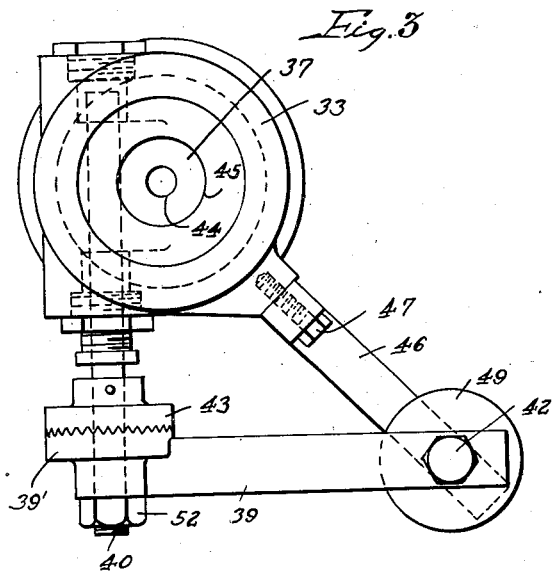
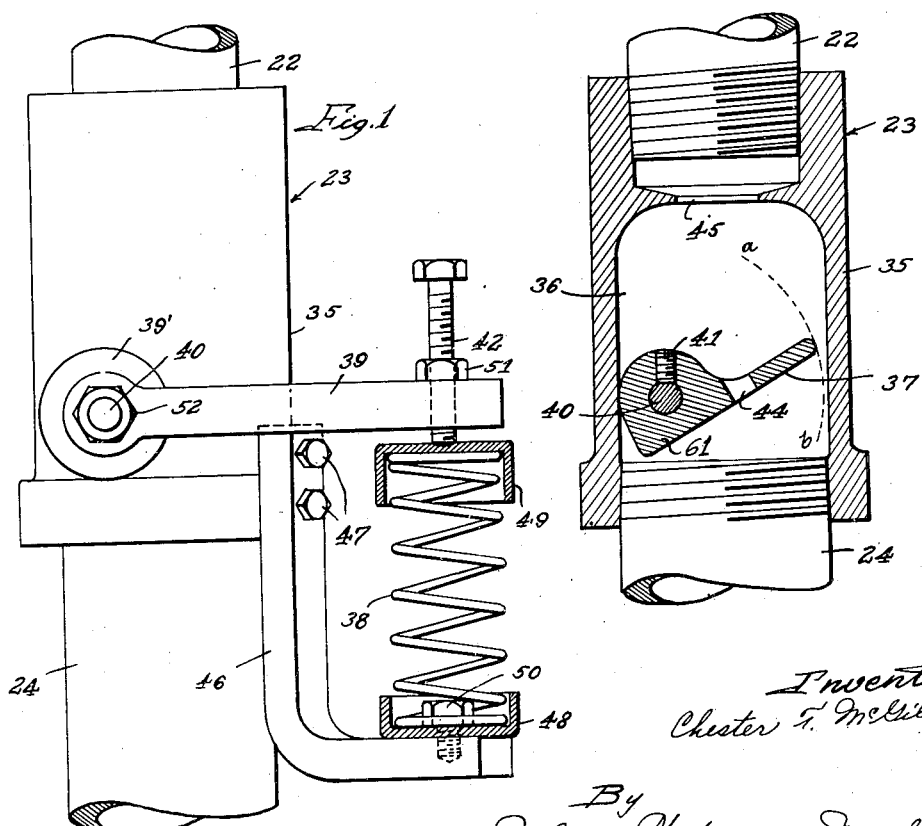
Inventor
Chester T. McGill
By McCanna, Wintercorn & Morsbach
Attys.

Patented Sept. 9, 1941

2,255,324

UNITED STATES PATENT OFFICE 2,255,324

FLOW REGULATING VALVE

Chester T. McGill, Elgin, Ill., assignor to Elgin Softener Corporation, Elgin, Ill., a corporation of Illinois Application February 15, 1938, Serial No. 190,660

10 Claims. (Cl. 137—152)

This invention relates to flow regulating devices and has for its principal object the provision of an improved, spring-loaded, flapper type flow regulating valve adapted to operate automatically to maintain a uniform rate of flow of water or other fluid regardless of anticipated variation in pressure.

Another object of my invention is to provide a flow regulating device of the kind mentioned embodying means for quickly and easily adjusting the same to suit requirements in a given installation.

The invention is illustrated in the accompanying drawing, in which

Figure 1 is a front elevation of a flow regulating valve embodying my invention, a portion thereof being shown in section to better illustrate the construction;

Fig. 2 is a longitudinal section through the body of said valve, and

Fig. 3 is a plan view of Fig. 1.

The same reference numerals are applied to corresponding parts in these views.

The flow regulating valve of my invention was designed for use in liquid treatment apparatus and, more particularly, to regulate the flow of water used in backwashing base exchange water softeners to avoid sudden surging due to varying water pressure while permitting rapid flow for good cleansing of the zeolite bed without the danger of losing zeolite in the event of a sudden surge in water pressure, as well as to better proportion the water and brine solution and regulate the flow of brine through the softeners in regeneration and thus obtain higher efficiency. However, it must be understood that the flow regulating valve of my invention is not limited to that specific application but may be used wherever it is desired to regulate the flow of water or other fluid automatically to a uniform rate regardless of anticipated variation in pressure. Thus, while the pipe indicated at 22 is a drain pipe for conducting water from the top of a softener tank through the flow regulating valve 23 to the waste pipe 24, which conducts the waste water to the sewer, it will be understood that the pipes 22 and 24 in other installations will serve other purposes than those just mentioned.

The flow regulator of the present invention is a self-contained unit in which the position of the valve is directly controlled by the load it imposes on a spring directly connected therewith, so that the flow of water is regulated immediately upon opening the backwash valve and regulation occurs instantly before any water has passed to the drain, thereby preventing bed blowing, which has been a very expensive source of trouble to users of downflow filters and downflow water softeners. The use of this type of flow regulator in the waste line absolutely eliminates water hammer due to the surging of water when changing a multiple port valve from one position to another, or when opening any other hand operated valve too rapidly. The water hammer is eliminated because the control valve closes off entirely, or almost entirely, upon the first rush of water, and will gradually open thereafter to permit a predetermined flow rate. As shown in the drawing, the backwash control valve or flow regulator 23 comprises a tubular body 35 in the upper end of which the drain pipe 22 is arranged to be connected. It will be noticed that the bore 36 in the tubular body 35 is larger than the pipe connection 22. The reason for this is that the regulating function of this valve does not depend upon the pressure but on the volume of water passing through the bore, the water striking the pivoted flapper 37 and forcing the same downwardly against the resistance of the coiled compression spring 38 operatively connected through the lever 39 to the shaft 40 on which the flapper 37 is adjustably secured by means of the set screw 41. After the spring 38 is compressed and the water has expended its force, the spring expands and opens the valve enough to permit a steady flow. By using different tensioned springs and by making adjustments, like adjusting the screw 42 or changing the position of the serrated flanged inner end 39' of the lever 39 relative to the serrated collar 43 fixed on the shaft 40, or changing the position of the flapper 37 by loosening and tightening the set screw 41, any desired flow rate may be obtained. Obviously, the greater the water pressure becomes, the more the flapper 37 will be shifted by the increased flow of water and cut down the opening or vent left for water flow through the bore 36, whereby to maintain a substantially uniform flow. Contrariwise, upon drop in water pressure, the decreased flow of water past the flapper 37 permits the spring 38 to expand and shift the flapper to a position of increased opening so as to maintain the same uniform rate of flow despite the decrease in pressure. An orifice 44 may or may not be provided in the flapper 37, as desired. On certain sized units it was found that with such an orifice a more perfectly regulated flow was obtained. However, usually where smaller volumes of water are handled, the regulation is sufficiently accurate without such an orifice. It will also be observed that there is a restricted central inlet port 45 provided in the upper end of the bore 36 under the drain pipe connection 22. This establishes a predetermined relationship between the diameter of the bore and the diameter of the inlet port and also insures that the incoming water will be directed toward the center of the flapper 37 to cause the same to shift its position in response to changes in water pressure. The spring 38 is supported on an arm 46 bolted or otherwise suitably secured to the body 35, as at 47. Thimbles 48 and 49 provide retainers and abutments for the opposite ends of the spring 38, the thimble 48 being fastened to the end of the arm 46, as at 50, and the thimble 49 bearing against the projecting end of the adjusting screw 42. A lock nut 51 on the screw 42 serves to hold it in adjusted position. Another lock nut 52 threaded on the end of the shaft 40 serves to hold the arm 39 in adjusted relation to the shaft. The flapper 37, as indicated by the arc $a$—$b$ in Fig. 2 which is struck with the shaft 40 as a center, fits quite freely in the bore 36 and even when it is moved to a limit position substantially at right angles to the longitudinal axis of the bore where the stop shoulder 61 strikes the adjacent side of the bore to prevent further movement, the bore is not fully closed but an appreciable amount of water is allowed to flow around the edges of the flapper in addition to what will, of course, flow through the orifice 44 when one is provided. The fact that the flapper is pivoted so close to one edge makes it more responsive to change in water flow inasmuch as almost all of the force is exerted in a closing direction, as distinguished from the butterfly type of valve, which when it is attempted to use the same in a water flow regulating device like this does not give the desired action due to the extent to which the force tending to close the valve is counteracted in the valve itself.

With the flow regulator just described, an adjustment can be made permanently at the time of installation, and the softener will thereafter function indefinitely without requiring any special attention. When properly adjusted, the flow regulator permits the fastest cleaning of the zeolite bed without danger of loss of zeolite to the drain, regardless of varying water pressures. Nothing is left to the judgment of an unskilled or careless operator, and the danger of bed blowing is eliminated. By virtue of the fact that the fastest flow can be maintained, the regeneration is accordingly speeded up and there is an actual saving in the amount of water needed for backwashing, because of the increased efficiency of operation.

It is believed the foregoing description conveys a good understanding of the objects and advantages of my invention. The appended claims have been drawn with a view to covering all legitimate modifications and adaptations.

I claim:

1. In a fluid flow regulating device of the character described, a tubular body having inlet and outlet openings at its opposite ends, a flapper pivotally mounted in said body intermediate the ends thereof on an axis transverse in relation to the longitudinal axis of the body and offset laterally therefrom to an edge portion of the flapper and next to the wall of the body, said flapper being of a size and shape to fit freely in the bore of said body so as to substantially restrict but not shut off flow through said bore when disposed substantially at right angles to the longitudinal axis of the body, a lever swingable with the flapper but outside said body, said flapper tending to assume a position at right angles to the longitudinal axis of the body by reason of its mass and being movable toward such right angle position in response to flow through said body from the inlet to the outlet, and spring means cooperating with said lever to position the flapper inclined toward the inlet end of the body at an acute angle to the longitudinal axis of said body and resisting the movement thereof to the right angle position, the resistance increasing as the flapper moves toward the right angle position.

2. A device as set forth in claim 1 wherein the flapper has an orifice provided therethrough of small size in relation to the bore of the body to supplement the flow of fluid around the edges of the flapper in its extreme position.

3. A device as set forth in claim 1 wherein the body has a restricted inlet port in the inlet end thereof substantially centrally located on a line parallel to the longitudinal axis of the body passing through the approximate center of the flapper.

4. A device as set forth in claim 1 wherein the body has a restricted inlet port in the inlet end thereof substantially centrally located on a line parallel to the longitudinal axis of the body passing through the approximate center of the flapper, and wherein said flapper has an orifice provided therethrough of small size in relation to the bore of the body to supplement the flow of fluid around the edges of the flapper in its extreme position.

5. In a fluid flow regulating device of the character described, a tubular body having inlet and outlet openings at its opposite ends, a flapper pivotally mounted in said body intermediate the ends thereof on an axis transverse in relation to the longitudinal axis of the body and offset laterally therefrom to an edge portion of the flapper and next to the wall of the body, said flapper being of a size and shape to fit freely in the bore of said body so as to substantially restrict but not shut off flow through said bore when disposed substantially at right angles to the longitudinal axis of the body, a lever swingable with the flapper but outside said body, said flapper tending to assume a position at right angles to the longitudinal axis of the body by reason of its mass and being movable toward such right angle position in response to flow through said body from the inlet to the outlet, a spring abutment stationary in relation to the body, a coiled compression spring disposed between said abutment and the free end of said lever and tending normally to position the flapper inclined toward the inlet end of the body at an acute angle to the longitudinal axis of said body and resisting the movement thereof to the right angle position, the resistance increasing as the flapper moves toward the right angle position, and a screw threaded adjusting means on one of said lever and abutment cooperating with the adjacent end of the spring to adjust the compression of said spring independently of movement of the flapper.

6. In a fluid flow regulating device of the character described, a tubular body having inlet and outlet openings at its opposite ends, a flapper pivotally mounted in said body intermediate the ends thereof on an axis transverse in relation to the longitudinal axis of the body and offset laterally therefrom, said flapper being conformed to fit the bore of said body, whereby to substantially restrict but not shut off fluid flow through said bore when disposed at a predetermined angle to the longitudinal axis of the body, a lever swingable outside the body about the flapper axis as a center in the opening and closing movements of the flapper, means pivotally adjustably connecting said lever and flapper outside the body on the flapper axis to change the angularity of the lever in relation to the flapper, and spring means arranged to be loaded by said lever in its swinging movement incident to the closing movement of the flapper, said spring means being also arranged to have its loading varied by pivotal adjustment of the lever relative to the flapper.

7. A device as set forth in claim 1 including a stop shoulder on the flapper arranged to engage the wall of the bore when the flapper is moved to a position substantially at right angles to the bore.

8. A device as set forth in claim 5, including a stop shoulder on the flapper arranged to engage the wall of the bore when the flapper is moved to a position substantially at right angles to the bore.

9. A device as set forth in claim 6, including a stop shoulder on the flapper arranged to engage the wall of the bore when the flapper is moved to a position substantially at right angles to the bore.

10. A device as set forth in claim 6, including screw threaded adjusting means on the lever for changing the relationship between the lever and the spring means.

CHESTER McGILL.